United States Patent [19]
Demarest

[11] 3,822,692
[45] July 9, 1974

[54] CONTROLLED SOLAR ENERGIZED POWER GENERATOR

[76] Inventor: James A. Demarest, 3467 E. Voltaire, Phoenix, Ariz. 85023

[22] Filed: May 25, 1973

[21] Appl. No.: 364,041

[52] U.S. Cl. .................................. 126/271, 60/26
[51] Int. Cl. .............................................. F24j 3/02
[58] Field of Search ........ 250/206, 215, 201; 60/26; 126/270, 271

[56] References Cited
UNITED STATES PATENTS

| | | | |
|---|---|---|---|
| 2,902,028 | 9/1959 | Manly | 126/271 |
| 3,152,442 | 10/1964 | Rowenkamp | 126/271 |
| 3,450,192 | 6/1969 | Hay | 126/270 |
| 3,587,559 | 6/1971 | Nonaka | 126/271 |

Primary Examiner—Archie R. Borchelt
Assistant Examiner—D. C. Nelms
Attorney, Agent, or Firm—Warren F. B. Lindsley

[57] ABSTRACT

A power generating system includes a closed fluid-flow circuit having tubes extending adjacent a plurality of lens which direct the solar energy to the tubes. A thermostatic or pressure sensing unit operates a shade device or a separate heating unit to control the temperature and the pressure of the liquid in the system to provide a constant source of pressurized gas for the power generator.

8 Claims, 4 Drawing Figures

3,822,692

CONTROLLED SOLAR ENERGIZED POWER GENERATOR

BACKGROUND OF THE INVENTION

This invention relates to the generation of power by the utilization of solar energy. It more specifically relates to a power generator utilizing controlled solar energy with a supporting energy producing element.

FIELD OF THE INVENTION

The practical utilization of solar energy for domestic and industrial applications has been a problem which has long interested scientists and engineers. With ever increasing demands on the conventional, non-replaceable fossil fuels, such as coal, natural and manufactured gases, petroleum products, etc., and the potential shortages thereof, the need for a supplemental fuel source becomes more and more important.

The utilization of solar energy presents problems because of the intermittant nature of the solar cycle. At night time, conventional fuels can be utilized to support the solar power generator. During the early morning and late evening hours, and in the parts of the earth where the sun's rays are moderate, a low boiling point fluid can be heated by the solar energy and produce a somewhat efficient solar generator. However, in most parts of the earth, the solar energy varies considerably from sunrise to sunset. Thus, what is needed is a power generator which can control the energy supplied to it and can function in all sections of the earth during the entire year cycle.

DESCRIPTION OF THE PRIOR ART

For many years, man has attempted to utilize solar energy for the generation of power to provide electricity or to heat and cool his structures. Most prior art devices attempted to use the full energy of the sun during all possible daylight hours to heat vast quantities of liquids so that the power generation or heat utilization could continue during the times that the solar energy was not available. For the most efficient usage of solar energy, a liquid having a relatively low boiling point is needed to provide the pressurized gas to operate the power generators. However, the utilization of the low boiling point liquid causes problems when the sun is at its apex and the heat generated by the sun is in access of that required to keep the system operating. The liquid will tend to prevaporize, causing problems in the further utilization of it and will cause an excessive heat buildup in the energy gathering section of the power generator.

SUMMARY OF THE INVENTION

A solar operated power generator according to an embodiment of the present invention comprises a solar boiler including a pressure storage tank, and a housing for storing tubes forming a closed fluid flow circuit. Lens mounted at an acute angle on the housing receive, direct and magnify the rays from the sun onto the tubing. A control unit senses the liquid and accordingly, manipulates a shading means to control the sun's rays striking the tubing and to operate a control valve means to control a second heating element to provide additional energy.

The solar boiler produces a gaseous energy which is directed to a prime mover such as a turbine. The turbine drives a power generator, such as an electrical generator, to provide a power source. The exhausted gaseous energy is transferred to a condenser to condense the gas to a liquid and then to a reservoir for storage of the liquid. A pump means returns the liquid for recycling to the solar boiler and its pressure storage tank. The pump means is controlled by the liquid sensing means to control the flow of liquid to the pressure storage tank according to the temperature and/or pressure of the liquid in the tubes associated with the pressure storage tank.

A replaceable liquid can be used to form a second embodiment. The expended gases can then be discarded instead of being recirculated.

It is, therefore, an object of the present invention to provide an enhanced solar operated power generator.

It is another object of the present invention to provide control apparatus for the constant usage of a solar operated power generator throughout the earth and during the entire year cycle of the solar system.

It is yet another object to provide a solar boiler utilizing a closed fluid system with a control apparatus controlling the solar energy, a second energy source, and the system fluid flow.

It is still another object to provide a solar boiler utilizing a replaceable fluid system with a control apparatus controlling the solar energy, a second energy source, and the rate of flow of the replacement fluid.

It is a further object to provide a temperature and/or pressure sensing control unit for operating a shading means to control the solar energy applied to a solar boiler, to control a second energy source in the event of a prolonged absence of the solar energy source, and to control the liquid flow through the solar boiler.

These and other objects of the present invention will become apparent to those skilled in the art as the description proceeds.

BRIEF DESCRIPTION OF THE DRAWING

The various novel features of this invention, along with the foregoing and other objects, as well as the invention itself, both as to its organization and method of operation, may be more fully understood from the following description of an illustrated embodiment when read in conjunction with the accompanying drawing wherein.

DESCRIPTION OF THE PREFERRED EMBODIMENT

Figure 4:
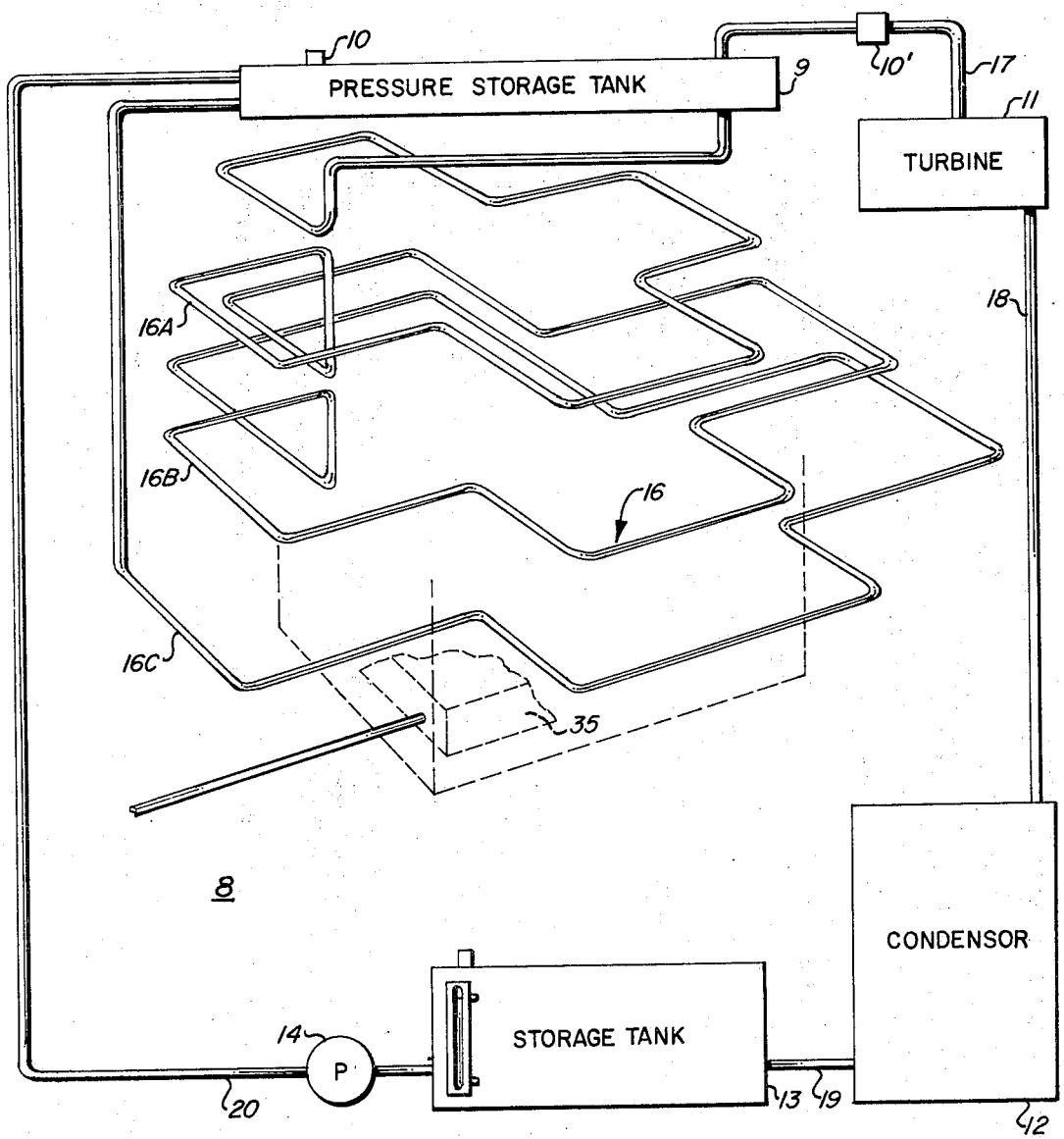
FIG. 4 represents diagrammatically the energy cycle of the solar operated power generator.

Referring now to the drawing, and in particular to FIG. 4, a closed circuit cyclic power-generator system is shown employing a solar boiler 8 comprising a pressure storage tank 9 having a suitable safety valve 10 and a pressure regulator 10', a turbine 11, a condenser 12, a storage tank 13, and a pump 14. A second source heating unit 35, possibly either gas or electric, is used when the solar energy directed to the solar boiler 8 is insufficient to continue the operation of the system. The solar energy and/or second source of energy heats a liquid in the solar boiler to a temperature in excess of its boiling point.

The solar boiler 8, according to one embodiment of this invention, can comprise a continuous tubing network 16 with the sun's energy heating the liquid in the tubing along its length. Raising the liquid to a temperature above its boiling point causes the liquid to enter a gaseous state. The gaseous fluid is self-propelled by its expanding state through a conduit 17 to a prime mover, such as the turbine 11. Turbine 11 can be connected to a utilization device, such as a generator (not shown), for producing electrical power. The flow of gaseous fluid under pressure actuates the rotation of the turbine and thus rotates an armature in the generator in the well-known manner to produce electricity.

After the energy of the gaseous fluid directed to the working medium, the turbine 11 and the generator has been expended, it is exhausted from the turbine 11 through a second conduit 18 and is discharged to condenser 12. Condenser 12 cools the fluid exhaust from the turbine and passes the condensate to storage tank 13 through a third conduit 19. The liquid condensate remains in storage tank 13 until it is recycled through a fourth conduit 20 by pump 14 for return to the pressure storage tank 9 and reconversion by reheating into a gaseous state. The pressure storage tank 9, turbine 11, condenser 12, storage tank 13 and recirculating pump 14, and a tubing network 16 and associated lens 24, comprise a solar operated power generator.

The power generated may be used by individual homeowners to provide a source of power which can be used alone as a sole source of electrical energy or to heat or cool the house, or in conjunction with commercially available power to supplant that obtained from the commercial generating source. Thus, according to the preferred embodiment of the present invention, the pressure storage tank 9 may be installed in a housing 22 (see FIG. 1) and for, for example, mounting on a rooftop of a building.

Figure 1:
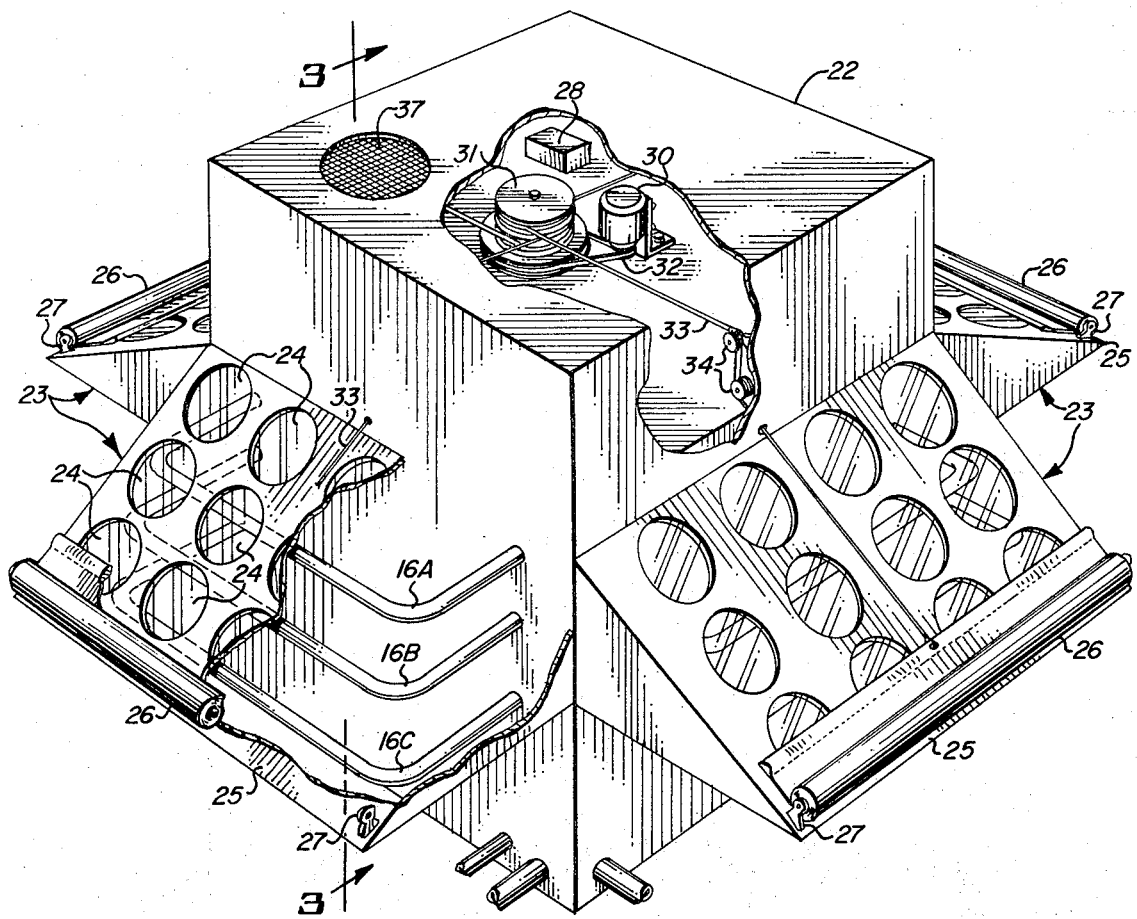
FIG. 1 is an elevated sectional view of a solar boiler for use in a solar operated power generator according to the present invention.
Figure 3:
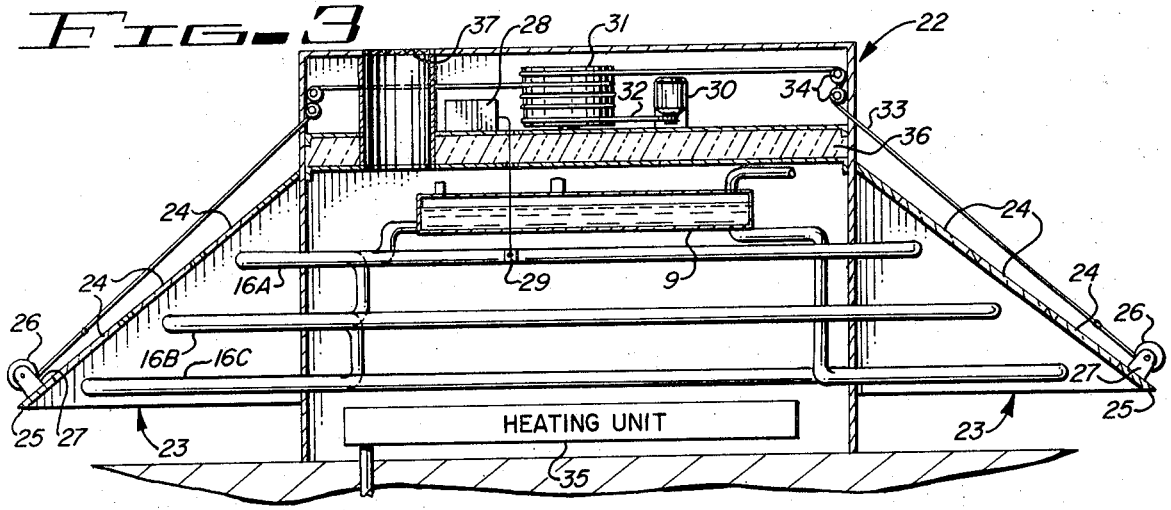
FIG. 3 is a side sectional view taken along lines 3—3 of FIG. 1 showing the interior of the solar boiler.

Referring to FIGS. 1 and 3, housing 22 of the solar boiler includes the tubing network 16 having a series or plurality of tubes, such as tubes 16a-c, fabricated as in FIG. 4, for projecting into enclosed extensions 23 added to each of the four sides of the housing. A plurality of lens 24 are mounted in holes formed in a platform 25. Platform 25 comprises the top of extension 23 and may completely be enclosed with platform 25. It is mounted at an angle to the earth's horizon such that lens 24 may receive, aim and magnify the direct rays of the sun onto tubing 16 of the solar boiler 8. Platform 25, therefore, is preferably mounted perpendicular to the predominant rays of the sun for the time of the year and laterally of housing 22. Lens 24 concentrate the sun's rays onto tubing 16 and the tubing, by conduction, heats the liquid flowing therein. The liquid will continue to rise in temperature until the boiling point of the liquid is reached at which time the liquid will change to a gaseous state and be stored in the pressure storage tank 9. The gas will expand, increase in pressure, and drive the turbine 11 in a well-known manner.

Lens 24 can be standard convex lens commonly called magnifying lens to concentrate the sun's rays on the tubing located beneath them. They can also be bi-convex, plano-convex and/or concavo-convex lens. These lens are thicker at the center of the lens than at the edges and thus have a convergent effect. The convergent effect would be to concentrate the sun's rays onto a smaller area. A Fresnel lens comprising a series of convergent lens would be especially useful because of the short focal length and large diameter possible. The interior of housing 22, and especially the interior of platform 25, should preferably be covered with a dull black material to absorb as much heat as possible from the sun's rays.

Still referring to FIGS. 1 and 3, a plurality of shades 26 are shown, each mounted to an outer edge of an associated platform 25 by a pair of brackets 27 with the shades 26 fully retracted. Therefore, the full effect of the sun's rays contact tubing 16 via lens 24. If the sun's rays are too strong, and the temperature of the fluid, either as liquid or gas, in the tubing becomes too high, a thermostatic control unit 28 via a heat sensor 29 (see FIG. 3), activates a reversible electrical motor 30 to rotate a drive pulley 31 via a drive belt 32. Rotating the drive pulley 31 reels in a line 33 via supporting pulleys 34. The line 33 is attached to an associated shade 26. Rotating the drive pulley 31 causes all of the shades to be drawn over its associated platform to selectively cover some of the lens. Thus, some of the sun's ray's are prevented from contacting the tubing 16 of the solar boiler 8 and thereby effectuating a lowering of the temperature of the fluid in the tubing.

Shades 26, shown in FIG. 1, are common, spring loaded, household shades. A coil spring internal to the shade roll is placed under tension by extending the shade. Therefore, as line 33 is slackened by a reverse revolution of motor 30, as when the temperature of the fluid in the tubing falls below a level set for efficient operation, the shades will retract and uncover selective lens 24. As the heat sensor 29 on tubing 16 senses an increase or a decrease in the temperature of the tubing of the solar boiler, the shades cover more or less of the lens. Limit switches (not shown) can be attached to drive pulley 31 to limit the operational distance, the fully extended or fully retracted position of the shades.

The thermostatic control unit 28, via sensor 29, can also sense the excessive lowering of the temperature even though shades 26 are in their fully retracted position. This would sense that perhaps the sun had set or clouds have obstructed the sun's rays, and a second energy source is required to maintain the operational temperature of the liquid within the solar boiler to continue providing a pressurized fluid to the turbine to drive the generator. At this time, the thermostatic control unit 28 can actuate a source of energy such as gas or electricity applied to a heating unit 35 mounted within housing 22 of the solar boiler 8 (see FIG. 3). Energizing the second heating unit 35 will apply heat to the liquid to continue supplying the pressurized fluid to the turbine. Insulation 36 protects the control units from the heat generated by the solar boiler. A vent 37 is used if the second energy source is a combustible gas.

Although a reversible electrical motor 30 driving the drive pulley 31 is shown to control the shading of the tubing of the solar boiler, a pressure-operated valve (not shown) could equally well be used to raise and lower the shades. The pressure-operated valve could sample the pressure of the gas in the tubing. If the pressure increases beyond a predetermined pressure, the pressure-operated valve can operate a lever which causes the shades to be drawn across the lens, thereby obstructing the contact of the sun's rays on the tubing.

A second pressure-operated valve or a temperature control could be used to activate the heating unit 35 used as the second heating source.

Figure 2:
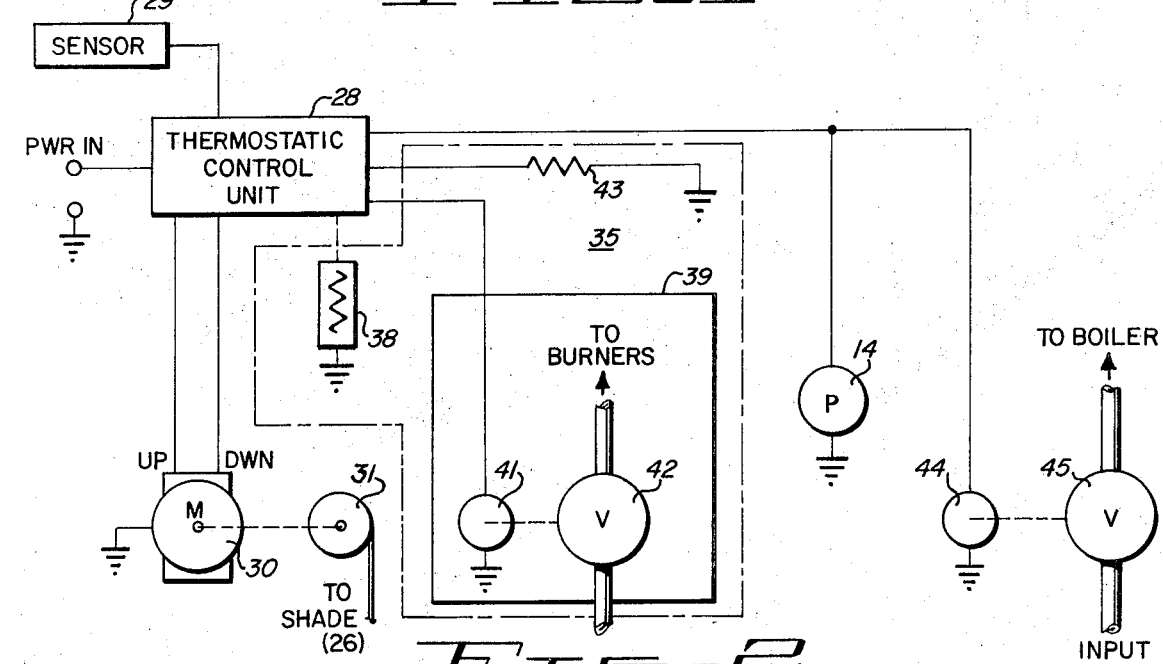
FIG. 2 is a diagram of the control unit for use in the solar boiler shown in FIG. 1.

In FIG. 2, a diagram of the circuitry which can operate the controlled solar boiler, according to the present invention, is shown. The thermostatic control unit 28 senses the temperature of the fluid in the tubing via a sensing device, such as sensor 29 (see FIG. 3). Sensor 29 can be a bimetallic strip, a thermocouple, or any of the other well-known temperature sensing devices. When sensor 29 senses a predetermined temperature, such as the boiling point or above of the liquid within the tubing network 16, pump 14 (see FIG. 4) is activated to circulate more liquid from the storage tank 13 into the pressure storage tank 9. If the temperature, as sensed by sensor 29, continues to rise, the thermostatic control unit 28 will activate the reversible electrical motor 30 to rotate drive pulley 29 and draw shades 26 over some of the lens. The thermostatic control unit 28 can reverse the electrical motor 30 and thereby let shades 26 retract if the temperature starts to decrease. Thus, the thermostatic control unit 28 will control the direction of rotation and the number of revolutions of the electrical motor 30 to manipulate the number of lens 24 covered by shade 26 and thereby regulate the temperature and the pressure of the fluid in the solar boiler.

Still referring to FIG. 2, the thermostatic control unit 28 senses a lowering of temperature in the solar boiler to actuate the second heating unit 35, which, for example, may be either an electrical resistance heater 38 or a combustible gas burner 39. The thermostatic control unit 28 can directly switch the electrical heater 38 to the electrical power supplied to the thermostatic control unit 28. In the case of using gas as a supplemental heater unit, the thermostatic control unit 28 can operate a gas valve solenoid 41 which operates to open a valve 42 to allow the gas to enter into the supplemental heating unit 35. An ignitor 43 or a pilot can be used to ignite the gas.

The thermostatic control unit 28 can comprise three standard household temperature sensing units or thermostats used to control a furnace or a refrigeration unit. One thermostat is adjusted to operate, open and close an electrical circuit at a temperature above the boiling point of the liquid in the tubing, the highest operational temperature of the system, to operate the reversible motor 30 to cover some lens 24 with shades 26. The second thermostat is adjusted at a somewhat lower temperature, the lowest operational temperature of the system. The second thermostat will operate motor 30 in the reverse direction to retract shades 26. The first thermostat can also operate pump 14 to continue the fluid flow of the system.

The third thermostat is set to actuate the second heating source 35 when the temperature of the fluid as sensed by sensor 29 falls below the boiling point of the liquid in the solar boiler.

The liquid used in the solar boiler may be water, especially in very warm areas of the earth. If water is used as the liquid in the solar boiler, condenser 12 and storage tank 13 of FIG. 4, as well as the closed fluid system, is not necessary. This does not mean that water cannot be used in a closed system of the present invention, but rather that the condensing and storage of the water need not be undertaken in the use of the solar power generator disclosed and claimed herein. Referring again to FIG. 2, the thermostatic control unit 28, instead of operating pump 14 for recirculating the liquid, can operate a water valve solenoid 44 which in turn operates a water valve 45 to allow water to enter directly into the pressure storage tank 9. The water would be used to replenish that lost after discharge from turbine unit 11. The discharged fluid can be directed to a sewer or other disposal means.

The liquid in the solar boiler can be Refrigerant 113 ($CCL_2F$-$CCLF_2$) when ambient temperature is below 100°F and hexafluoroiso propanol, $(CF_3)_2$ CHOH, when ambient temperature is above 100°F. Refrigerant 113 boils at 117.6°F and therefore very little heat is required to raise the liquid Refrigerant 113 to a boiling point. If Refrigerant 113 is used, the ambient temperature should be under 100°F to permit condensing the fluid by the use of air at an ambient temperature. For ambient temperatures in excess of 100°F, the hexafluoroiso propanol could be used since it boils at 136.8°F. The hexafluoroiso propanol could then be condensed by the use of ambient air even though the ambient temperature is more than 100°F.

The principles of the present invention have now been made clear in an illustrated embodiment. There will be immediately obvious to those skilled in the art many modifications of structure, arrangement, proportions, the elements, materials and components used in the practice of the invention. For instance, standard window shades are used in the present embodiment. It is obvious that louvered blinds could be substituted for the window shades with little additional apparatus. The louvered blinds could be similarly operated by the drive pulley and the reversible electrical motor or the pressure-operated valve. Further, a plurality of tubes could be contacted by the sun's rays directed from one lens or a plurality of lens could direct the sun's rays to one tube.

Further, the housing 22 as shown in FIG. 1 includes four sides and thus four extensions 23 are shown. It should be obvious that more extensions could be used to perhaps gain an increase in efficiency, such as if a hexagon configuration is used. Or perhaps, three would be sufficient to gain the cost savings of a lesser number of lens for instance, since the sun does not contact the north side of a structure located in the northern hemisphere of the earth. The number of extensions should not be taken as limiting the invention described herein.

The appended claims are, therefore, intended to cover and embrace any such modifications, within the limits only of the true spirit and scope of the invention.

What I claim is:

1. A solar energy operated assembly for controlled generation of fluid energy to a working medium comprising, in combination:
   a housing having a plurality of sides;
   a solar boiler including a tubing network projecting from each side of said housing;
   an extension attached to each side of said housing enclosing said projecting tubing network, said extension including a platform mounted such that said platform is positioned laterally to predominant rays of the sun;

a plurality of convergent type lens mounted in holes formed through each of said platforms such that rays of the sun converged by said lens contact said tubing network;

a shading means fastened to each of said platforms for selectively covering the lens mounted on its associated platform to cause and prevent the sun's rays from striking the lens;

a sensing means attached to said tubing network for sensing the energy of a fluid heated within said tubing network;

a second source heating unit mounted in said housing for providing heat to said tubing network; and a control unit coupled to said sensing means and responsive thereto for operating said shading means to cover said lens when the energy in said tubing network reaches a preselected rate and to uncover said lens when the energy decreases below a preselected rate, and for operating said second source heating unit when the energy decreases below a second preselected rate, and for controlling the fluid flow to said tubing network.

2. A solar energy operated assembly as described in claim 1 wherein said convergent type lens comprises a Fresnel lens.

3. A solar energy operated assembly as described in claim 1 wherein said shading means comprises a household shade including a rod supported between two brackets and biasing means for retracting said shade, said shade comprising a cloth-like material, wherein said control means draws said shade over said lens and, coupled with said biasing means, retracts said shade to uncover said lens.

4. A solar energy operated assembly as described in claim 1 wherein said sensing means senses the pressure in said tubing network and said control unit comprises a pressure operated valve and lines inter-connecting said valve and said shading means.

5. A solar energy operated assembly as described in claim 3 wherein said sensing means senses the temperature in said tubing network and said control unit includes a thermostatic control unit, a reversible motor actuated by said thermostatic control unit, a drive pulley connected to be rotated by said reversible motor, a plurality of lines, one for each shade, wound around said drive pulley on one end and connected to said shade at its other end, limit switches controlling the operation of said motor to limit the extended and retracted position of said shade, control valve means actuated by said thermostatic control unit for controlling the fluid flow to said tubing network, and enabling means controlled by said thermostatic control unit for enabling said second source heating unit.

6. A solar energy operated assembly as described in claim 1 wherein said tubing network of said solar boiler comprises a continuous series of tubes from an inlet of the solar boiler projecting in all of said extensions to an outlet of the solar boiler.

7. A solar energy operated assembly as described in claim 1 wherein said solar boiler comprises a tank of liquid directly heated by said second source heating unit and said tubing network comprises tubes fastened to said tank and projecting into said extensions for contacting the sun's rays.

8. A solar energy operated power generating assembly for the continuous controlled generation of mechanical energy comprising:

a solar boiler operable to provide a fluid current by adding heat to a fluid;

a turbine connected to said solar boiler for converting the energy of the fluid current into mechanical energy;

a condenser connected to condense the fluid exhausted from said turbine;

a storage tank connected to store the fluid from said condenser; and a pump connected between said storage tank and said solar boiler to return the fluid to said boiler;

said solar boiler comprising in combination;

a housing formed around said solar boiler and having a plurality of sides;

a tubing network projecting from each side of said housing;

an extension attached to each side of said housing enclosing said projecting tubing network, said extension including a platform mounted such that said platform is essentially lateral to predominant rays of the sun;

a plurality of convergent type lens mounted in holes formed through each of said platforms such that rays of the sun converged by said lens contact said tubing network;

a shading means fastened to each of said platforms for selectively covering the lens mounted on its associated platform to prevent and allow the sun's rays from striking the lens;

a sensing means attached to said tubing network for sensing the energy of a fluid heated within said tubing network;

a second source heating unit mounted in said housing to provide heat to said tubing network; and a control unit coupled to said sensing means and responsive thereto for operating said shading means to cover said lens when the energy in said tubing network reaches a preselected rate and to uncover said lens when the energy decreases below a preselected rate, and for operating said second source heating unit when the energy decreases below a second preselected rate, and for controlling the fluid flow to said tubing network.

* * * * *